(12) United States Patent
Mikami

(10) Patent No.: US 10,320,065 B2
(45) Date of Patent: Jun. 11, 2019

(54) ELECTRONIC CIRCUIT BOARD

(71) Applicant: CANON KABUSHIKI KAISHA, Tokyo (JP)

(72) Inventor: Fumio Mikami, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 299 days.

(21) Appl. No.: 15/164,155

(22) Filed: May 25, 2016

(65) Prior Publication Data
US 2016/0365628 A1 Dec. 15, 2016

(30) Foreign Application Priority Data

Jun. 9, 2015 (JP) .................................. 2015-116884

(51) Int. Cl.
| | | |
|---|---|---|
| *H01Q 1/44* | (2006.01) | |
| *H01Q 1/38* | (2006.01) | |
| *H01Q 1/00* | (2006.01) | |
| *H04B 5/00* | (2006.01) | |
| *H01Q 7/00* | (2006.01) | |
| *H01Q 9/42* | (2006.01) | |

(52) U.S. Cl.
CPC ............... *H01Q 1/38* (2013.01); *H01Q 1/002* (2013.01); *H01Q 1/44* (2013.01); *H04B 5/00* (2013.01); *H01Q 7/00* (2013.01); *H01Q 9/42* (2013.01)

(58) Field of Classification Search
CPC .. H01Q 1/38; H01Q 1/44; H01Q 9/42; H01Q 1/50; H01Q 7/00; H04B 5/00
See application file for complete search history.

(56) References Cited

U.S. PATENT DOCUMENTS

| | | | | |
|---|---|---|---|---|
| 7,079,079 | B2 * | 7/2006 | Jo ........................... | H01Q 1/243 |
| | | | | 343/700 MS |
| 2005/0075689 | A1 * | 4/2005 | Toy .................... | A61N 1/37235 |
| | | | | 607/60 |
| 2011/0273819 | A1 * | 11/2011 | Sokola .................. | G06F 1/1626 |
| | | | | 361/679.01 |
| 2013/0078910 | A1 * | 3/2013 | Akiyama .......... | G06K 19/07749 |
| | | | | 455/11.1 |

FOREIGN PATENT DOCUMENTS

| | | |
|---|---|---|
| JP | 2005-244841 | 9/2005 |
| JP | 2013-165409 | 8/2013 |
| JP | 2014-96717 | 5/2014 |
| JP | 2014-106481 | 6/2014 |
| JP | 2014-182625 A | 9/2014 |

OTHER PUBLICATIONS

Japanese Office Action dated Mar. 18, 2019 during prosecution of related Japanese application No. 2015-116884. (English-language machine translation included.)

* cited by examiner

*Primary Examiner* — Dameon E Levi
*Assistant Examiner* — Hasan Z Islam
(74) *Attorney, Agent, or Firm* — Venable LLP

(57) ABSTRACT

An electronic circuit board includes an antenna pattern for wireless communication and an electrostatic removing member. The antenna pattern is arranged on a first surface of the electronic circuit board, the electrostatic removing member is arranged on a second surface of the electronic circuit board, the second surface being on a side opposite to the first surface, and the electronic circuit board is to be incorporated in a console unit of a printing apparatus.

20 Claims, 5 Drawing Sheets

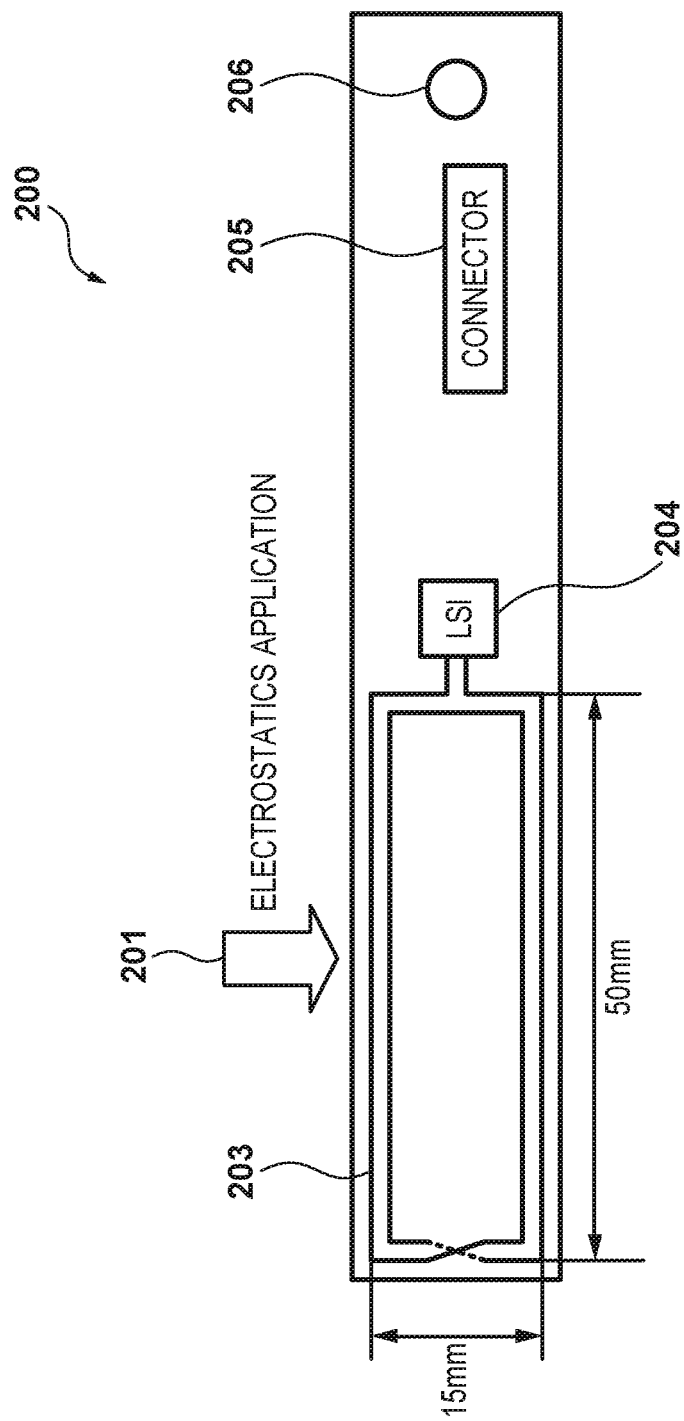

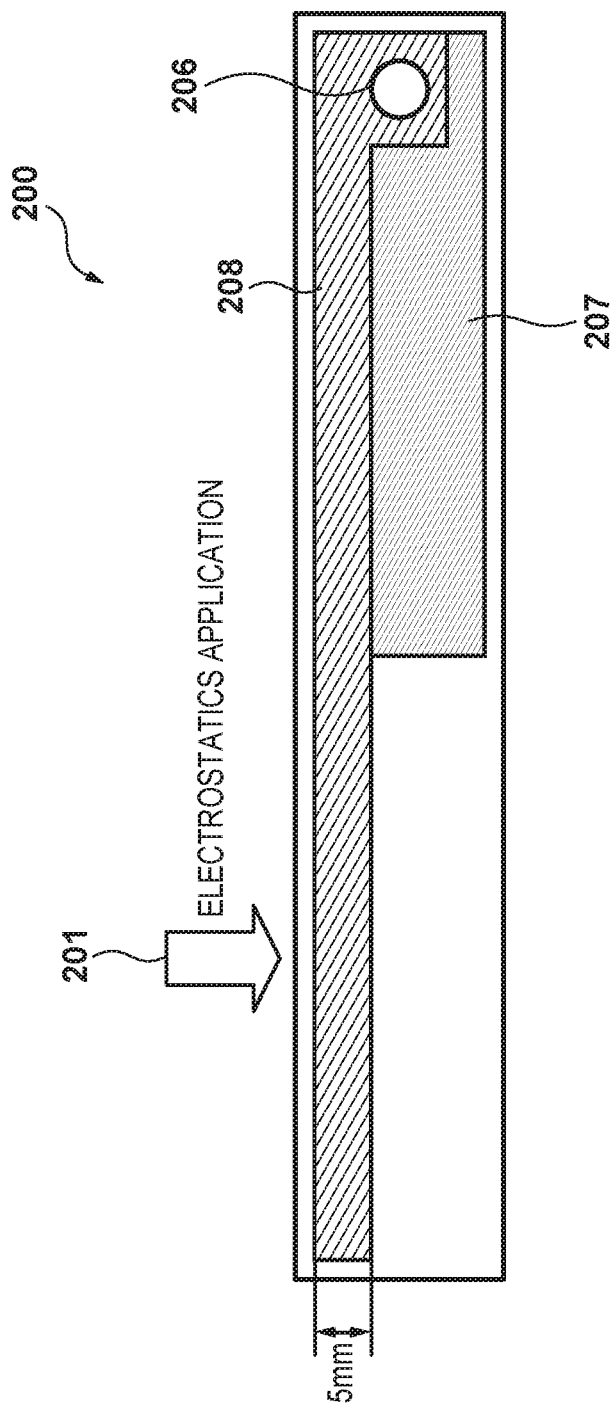

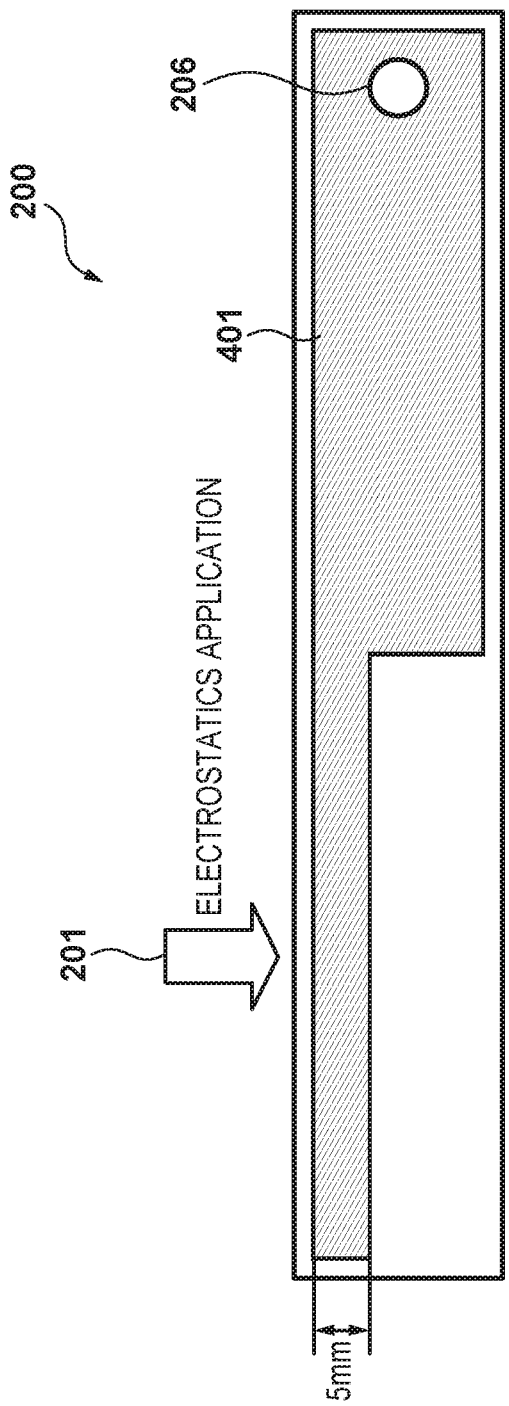

FIG. 5

|  | Z-DIRECTION | Y-DIRECTION | X-DIRECTION |
|---|---|---|---|
| NO ELECTROSTATICS REMOVING SHEET | 18mm | 48mm | 55mm |
| ELECTROSTATICS REMOVING SHEET WIDTH: 5mm | 18mm | 45mm | 53mm |
| ELECTROSTATICS REMOVING SHEET WIDTH: 7mm | 12mm | 25mm | 36mm |

ELECTRONIC CIRCUIT BOARD

BACKGROUND OF THE INVENTION

Field of the Invention

The present invention relates to an electronic circuit board.

Description of the Related Art

A lightning conductor fixing structure of a console panel unit in which a wire for inducing static electricity in the vicinity of a touch panel is fixed to a case of the touch panel with a holding member is disclosed in Japanese Patent Laid-Open No. 2014-182625, for example, as a conventional technology for fixing a lightning conductor to a console panel unit of an information processing device.

In the above conventional technology, the lightning conductor is constituted by a member different from the touch panel, which is the lightning protection target, and therefore an installation place for the lightning conductor is needed, which leads to an increase in size of the entire device. Also, since the touch panel and the lightning conductor are configured to be held by different members, the lightning conductor needs to be installed in a narrow place, which is accompanied by difficulty in manufacturing. Also, in a case where the lightning protection target is a wireless communication antenna, for example, there is a problem in that the characteristics of the antenna is affected if the lightning conductor is arranged in the vicinity of the wireless communication antenna.

SUMMARY OF THE INVENTION

An aspect of the present invention is to eliminate the above-mentioned problems with conventional technology.

A feature of the present invention is to provide a technology with which generation of noise due to static electricity is suppressed while suppressing an increase in the size of the entire device and reducing the influence on the characteristics of an antenna.

According to a first aspect of the present invention, there is provided an electronic circuit board comprising: an antenna pattern for wireless communication; and an electrostatic removing member, wherein the antenna pattern is arranged on a first surface of the electronic circuit board, the electrostatic removing member is arranged on a second surface of the electronic circuit board, the second surface being on a side opposite to the first surface, and the electronic circuit board is to be incorporated in a console unit of a printing apparatus.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a diagram for describing details of a surface on which an antenna pattern of a wireless communication board according to a first embodiment is arranged.

FIG. 3 is a diagram for describing a board surface on a side opposite to the surface on which the antenna pattern of the wireless communication board according to the first embodiment is arranged.

FIG. 4 is a diagram for describing a board surface on a side opposite to a surface on which an antenna pattern of a wireless communication board according to a second embodiment is arranged.

FIG. 5 is a diagram showing an experimental result of measurement on a distance of communication performed with an antenna pattern in order to determine an occupied area of an electrostatic removing sheet according to the embodiments.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1A:
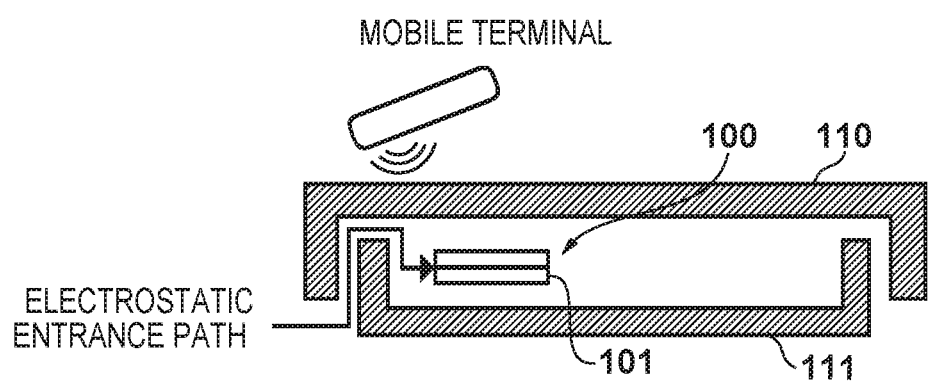
FIGS. 1A and 1B depict cross-sectional views for describing a path through which static electricity is to be applied to a wireless communication module board for NFC that is incorporated in a console unit of a printing apparatus.
Figure 1B:
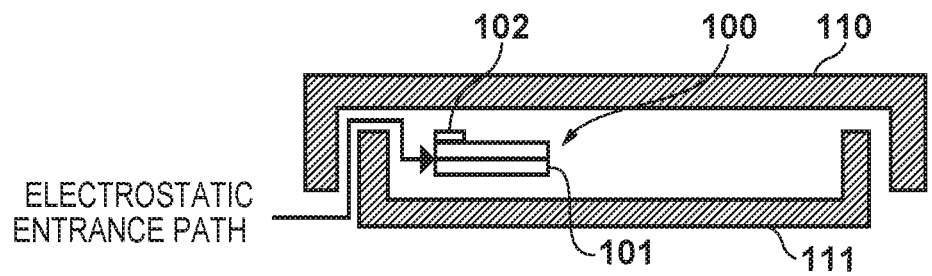

FIGS. 1A and 1B depict cross-sectional views for describing a path through which static electricity is applied to a wireless communication module board for NFC that is incorporated in a console unit of a printing apparatus. In FIG. 1A, a wireless communication module board 100 is mounted inside a console unit of a printing apparatus, and a state is shown in which the wireless communication module board 100 is communicating with a mobile terminal illustrated in the upper left side of the diagram.

In FIG. 1A, the exterior of the console unit includes members 110 and 111, a gap exists between the members 110 and 111, and therefore static electricity enters through the gap, as illustrated in the diagram, and is applied to an antenna pattern 101 of the wireless communication module board 100.

Thus, in a first embodiment, static electricity that has entered through the gap is applied to a lightning conductor member (electrostatic removing member) 102, and the static electricity is discharged to an unshown ground through the member 110 or 111, in FIG. 1B. In this way, the influence of static electricity on the wireless communication module board 100 and the antenna pattern 101 is eliminated.

Hereinafter, a specific example will be described in detail.

FIG. 2 is a diagram for describing details of a board surface on which an antenna pattern 203 of an electronic circuit board 200 for wireless communication according to the first embodiment is arranged.

The electronic circuit board 200 is a circuit board for wireless communication for performing NFC (Near Field Communication) communication, and is incorporated in a console unit of a multifunction peripheral (printing apparatus), for example. The antenna pattern 203 is an antenna pattern for communicating with an NFC device, and is formed by printed wiring on the circuit board 200. An LSI (Large-Scale Integration) 204 is an LSI for controlling NFC communication. A connector 205 is electrically connected to a main control unit (host controller (not shown)) of the printing apparatus that controls the LSI 204. Note that a circuit component, a wiring pattern, and the like between the connector 205 and the LSI 204 are not illustrated. A mounting hole 206 is a hole for attaching the circuit board 200 to a printing apparatus body by fastening the circuit board 200 to a casing metal portion of the printing apparatus, and is continuous to a ground pattern 207 (FIG. 3) of the circuit board 200.

In FIG. 2, an arrow 201 indicates a direction in which static electricity is applied to the circuit board 200. This direction corresponds to the entering direction of static electricity shown in FIG. 1. That is, the direction corresponds to the direction in which static electricity is applied to the antenna pattern through the gap between the members 110 and 111 in FIG. 1. When static electricity is applied to the circuit board 200 in this way, the performance of the antenna for wireless communication may possibly degrade, and thus a purpose of the present embodiment is to suppress the influence of static electricity to the minimum.

FIG. 3 is a diagram for describing a board surface on a side opposite to the surface on which the antenna pattern 203 of the circuit board 200 according to the first embodiment is arranged. The circuit board 200 is housed in an electronic device such as a printing apparatus or a portable terminal, for example, as a circuit board for wireless communication in which a circuit for wireless communication and an antenna pattern are mounted.

Here, an electrostatic removing sheet 208 made of aluminum, which is a conductive member, is adhered in close contact to the circuit board 200 on the board surface on the side opposite to the antenna pattern 203, and the electrostatic removing sheet 208 is fastened to a casing metal by a screw using the mounting hole 206 of the circuit board 200. With this, static electricity applied to the electrostatic removing sheet 208 is caused to flow to the ground of the electronic device via the mounting hole 206. If the electrostatic removing sheet 208 is adhered to the surface of the circuit board 200 on which the antenna pattern 203 is provided, performance as an antenna is degraded because the electrostatic removing sheet 208 is constituted by a conductive member. Therefore, in the first embodiment, the antenna performance is prevented from degrading by adhering the electrostatic removing sheet 208 on the surface of the circuit board 200 having a thickness of approximately 1.6 mm opposite to the surface on which the antenna pattern 203 is arranged. Also, an end portion of the electrostatic removing sheet 208 is arranged so as to substantially match an end portion of the antenna pattern 203 in the vicinity of a position of the board to which static electricity is applied, and as a result, a structure is configured such that the electrostatic removing sheet 208 is arranged in a midway of the path through which static electricity enters the antenna pattern 203.

Here, the area of the electrostatic removing sheet 208 is set to approximately one third of the area occupied by the antenna pattern 203 based on a result of study shown in FIG. 5.

In FIG. 2, the antenna pattern 203 occupies a region having a size of 15 mm by 50 mm, and the electrostatic removing sheet 208 is adhered to the surface opposite to the antenna pattern 203 in a width of 5 mm that is approximately one third of the width of the antenna region as shown in FIG. 3.

Note that the electrostatic removing sheet 208 is not limited to that having a sheet-like shape, and may be formed on the board by printed wiring.

FIG. 5 is a diagram showing an experimental result of measurement on the distance of communication performed with the antenna pattern 203 in order to determine an occupied area of the electrostatic removing sheet according to the embodiment.

Communication distances with a partner apparatus when an electrostatic removing sheet is not provided, when the width of the electrostatic removing sheet is 5 mm, and when the width of the electrostatic removing sheet is 7 mm are shown. Here, measured values include an error of approximately ±2 mm. Also, a mobile terminal including an NFC reader/writer was used as a partner apparatus. In the measurement method here, the intersection point of diagonal lines of the antenna pattern 203 was made to approximately match the center of an antenna of the mobile terminal, the horizontal direction is an X direction, the vertical direction is a Y direction, and the direction perpendicular to the circuit board 200 is a Z direction, in FIG. 2.

The results in FIG. 5 show that marked degradation in antenna performance is not seen in the case where the width of the electrostatic removing sheet is 5 mm compared with the case where there is no electrostatic removing sheet. However, in the case where the width of the electrostatic removing sheet is 7 mm, the communication distance decreases in the Z direction, the Y direction, and the X direction by 6 to 20 mm, and degradation in the antenna performance is apparent.

It can be seen that, based on the results, the antenna performance is not affected by setting the width of the electrostatic removing sheet 208 on the surface opposite to the antenna pattern 203 to 5 mm that is equal to or less than one third of the width of 15 mm of the antenna pattern 203. That is, the influence on the antenna performance is decreased by setting the size of the electrostatic removing sheet 208 that is right behind the antenna pattern 203 to equal to or less than one third of the effective area of the antenna pattern 203.

According to the first embodiment, as described above, the electrostatic removing sheet is arranged on the board surface on the side opposite to the board surface on which the antenna pattern is arranged, and the size of the electrostatic removing sheet is set to such a size that the antenna performance is not affected. Accordingly, the influence of static electricity that is applied to the circuit board for wireless communication can be decreased.

Second Embodiment

Next, a second embodiment of the present invention will be described. In the second embodiment, a ground pattern that is arranged on a surface of a circuit board for wireless communication opposite to an antenna pattern is formed on the surface opposite to the antenna pattern so as to extend with a width of 5 mm. Thus, a printed wiring pattern having a role of removing static electricity is formed. The effect of the second embodiment has been confirmed to be the same as that of the aforementioned first embodiment.

FIG. 4 is a diagram for describing a board surface on a side opposite to the surface on which an antenna pattern of a wireless communication board according to the second embodiment is arranged.

Functions of both the electrostatic removing sheet 208 and the ground pattern 207 in FIG. 3 are included in a ground pattern 401 in FIG. 4.

In the first embodiment described above, a cost is incurred for a member and work for adhering the electrostatic removing sheet 208 to the circuit board 200, and the cost is added to the product cost. In contrast, in the second embodiment, the electrostatic removing sheet 208 is not needed, and as a result the member cost and work cost for adhesion can be reduced.

Also, the first embodiment can be applied to cases where the circuit board 200 is incorporated in a plurality of different types of apparatus, as an application example. A case where the circuit board 200 is incorporated in an apparatus that requires measures against static electricity can be dealt with by adhering the electrostatic removing sheet 208. Also, in the case where the circuit board 200 is incorporated in an apparatus that does not require measures against static electricity, the electrostatic removing sheet is not adhered to the circuit board 200, and in this way, a common board can be incorporated in apparatuses having different structures.

Also, a case where the direction in which static electricity is applied is different from that in the first embodiment described above due to a difference in the shape of an apparatus to which the circuit board 200 is incorporated can be dealt with by changing the shape of the electrostatic removing sheet depending on the direction in which static electricity is applied.

On the other hand, the second embodiment is effective in cases where the circuit board 200 is incorporated in apparatuses in which the static electricity application direction is substantially the same, as an application example. In the second embodiment, the electrostatic removing sheet does not need to be adhered to the circuit board, and therefore a member cost and a work cost for adhesion can be reduced.

As described above, the circuit board according to the first embodiment can be realized by forming the wireless communication antenna pattern on the board, arranging the electrostatic removing sheet having the area that is equal to or less than approximately one third of the area of the antenna pattern on the surface opposite to the antenna pattern, and grounding the electrostatic removing sheet.

Also, according to the second embodiment, the ground pattern arranged on the surface of the circuit board for wireless communication opposite to the antenna pattern can be caused to function as a wiring pattern having a role of removing static electricity, by forming the ground pattern so as to extend on the surface opposite to the antenna pattern.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-116884, filed Jun. 9, 2015, hereby incorporated by reference herein in its entirety.

What is claimed is:

1. An electronic circuit board comprising:
    an antenna for wireless communication with a mobile terminal; and
    an electrostatic removing member,
    wherein the antenna is formed on a first surface of the electronic circuit board by printed wiring,
    the electrostatic removing member is arranged on a second surface of the electronic circuit board and grounded to flow static electricity that enters from an outside of a console unit of a printing apparatus to a ground, the second surface being on a side opposite to the first surface, and
    the electronic circuit board is incorporated in the console unit of the printing apparatus to which the mobile terminal is approached to perform the wireless communication.

2. The electronic circuit board according to claim 1, wherein the electronic circuit board is incorporated in the console unit of the printing apparatus in a state in which the second surface is oriented toward an entrance path for static electricity.

3. The electronic circuit board according to claim 1, wherein the electrostatic removing member is a conductive sheet.

4. The electronic circuit board according to claim 1, wherein the electrostatic removing member is a sheet made of aluminum.

5. The electronic circuit board according to claim 1, wherein a width of the electrostatic removing member is smaller than a width of the antenna.

6. The electronic circuit board according to claim 1, wherein a width of the electrostatic removing member is equal to or less than one third of a width of the antenna.

7. The electronic circuit board according to claim 1, wherein the antenna is an antenna for executing wireless communication by NFC (Near Field Communication).

8. The electronic circuit board according to claim 1, further comprising an integrated circuit for controlling communication via the antenna and a connector for electrically connecting to a controller of the printing apparatus that controls the integrated circuit, provided on the first surface of the electronic circuit board.

9. The electronic circuit board according to claim 1, wherein the electronic circuit board is mounted at a predetermined side of the console unit in the console unit, and
    wherein the electrostatic removing member is arranged at the predetermined side of the console unit on the second surface of the electronic circuit board.

10. The electronic circuit board according to claim 9, wherein the antenna has a rectangular shape and one long side of the antenna is located closer to the predetermined side than another long side of the antenna.

11. The electronic circuit board according to claim 1, wherein the electronic circuit board is mounted at a location toward a predetermined direction in the console unit, and
    wherein the electrostatic removing member is arranged at the location toward the predetermined direction in the console unit on the second surface of the electronic circuit board.

12. The electronic circuit board according to claim 1, wherein the antenna receives a radio wave from the mobile terminal that approaches from over the console unit, and
    wherein the first surface of the electronic circuit board on which the antenna is formed faces a lower part of the console unit, and the second surface of the electronic circuit board on which the electrostatic removing member is arranged faces an upper part of the console unit.

13. A printing apparatus performing a wireless communication with a mobile terminal, the printing apparatus comprising:
    a circuit board that performs the wireless communication with the mobile terminal; and
    a case for mounting the circuit board inside, to which the mobile terminal approaches to perform the wireless communication,
    wherein an antenna is formed on a first surface of the circuit board by printed wiring, and an electrostatic removing member is arranged on a second surface, being on a side opposite to the first surface, of the circuit board, wherein the electrostatic removing member is grounded to flow static electricity that enters from an outside of the case to a ground.

14. The printing apparatus according to claim 13, wherein the circuit board is mounted at a predetermined side of the case in the case, and wherein the electrostatic removing member is arranged at the predetermined side in the case on the second surface of the electronic circuit board.

15. The printing apparatus according to claim 14, wherein the circuit board is mounted in the case such that the first surface on which the antenna is formed faces down, and the second surface on which the electrostatic removing member is arranged faces up.

16. The printing apparatus according to claim 15, wherein the circuit board performs the wireless communication with the mobile terminal located over the case.

17. The printing apparatus according to claim 14, wherein the antenna and the electrostatic removing member respectively have rectangular shapes,
wherein a long side of the electrostatic removing member corresponds to a long side of the antenna, and a length of a short side of the electrostatic removing member is less than one third of a length of short side of the antenna.

18. The printing apparatus according to claim 13, further comprising an integrated circuit connected to the antenna that controls the wireless communication via the antenna and a connector for electrically connecting the integrated circuit to a controller of the printing apparatus, provided on the first surface of the circuit board.

19. The printing apparatus according to claim 13, wherein the circuit board is mounted in the case using a conductive member, and the conductive member electrically connects the electrostatic removing member to the ground of the printing apparatus.

20. The printing apparatus according to claim 13, wherein the antenna and the electrostatic removing member are respectively formed on the first surface and the second surface of the circuit board by printed wiring.

* * * * *